Aug. 1, 1939.                    J. ROBERTS                    2,167,853
                              EGG CANDLER AND STAMPER
                              Filed Oct. 7, 1936           3 Sheets-Sheet 1
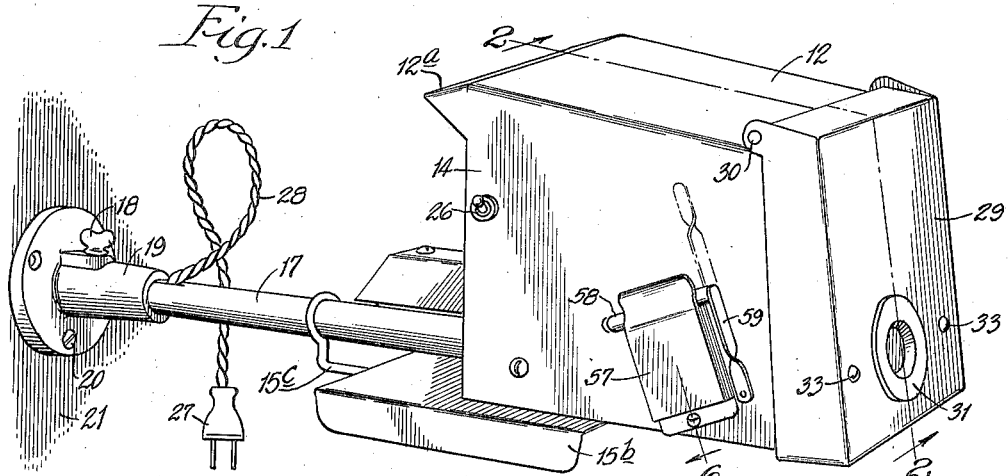
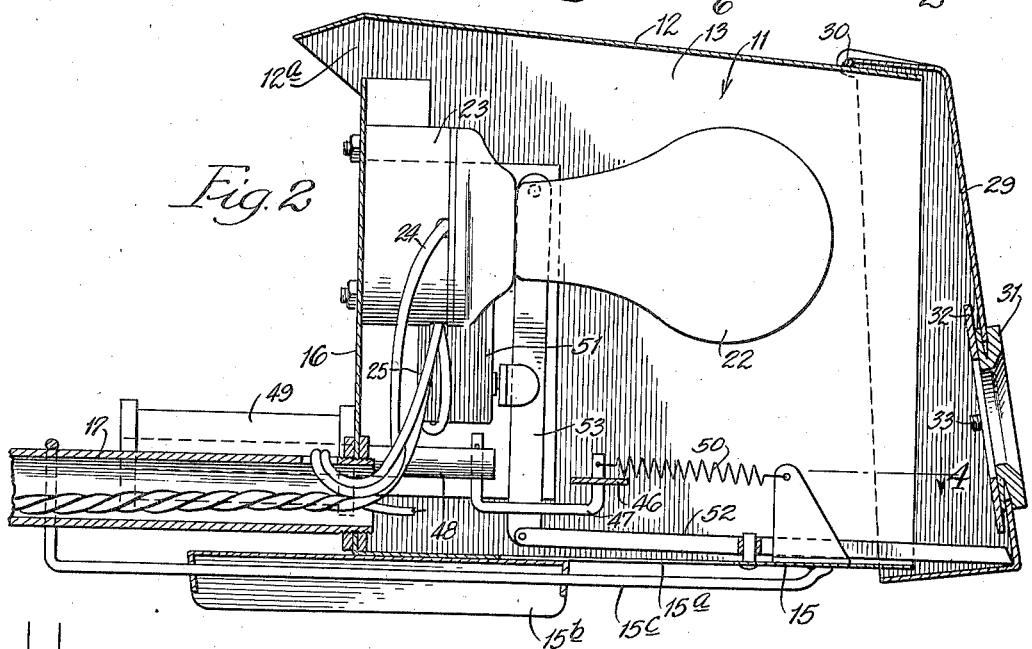
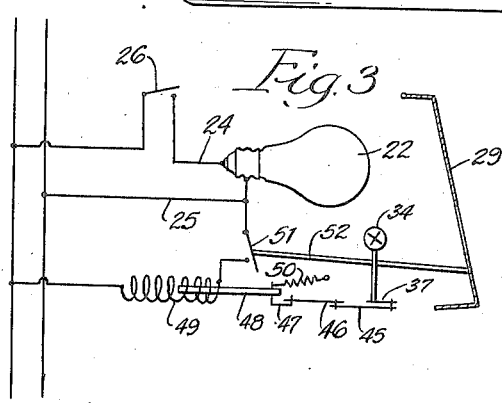
Inventor:
John Roberts,
By Banning & Banning
Attys.

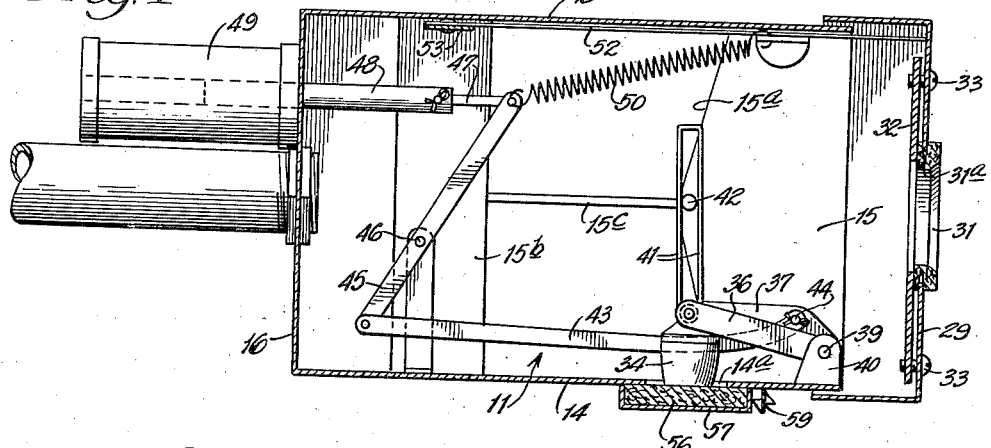
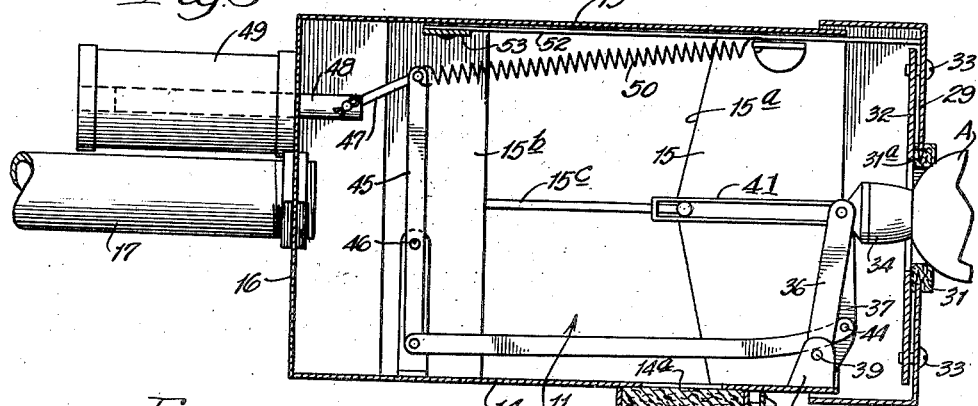
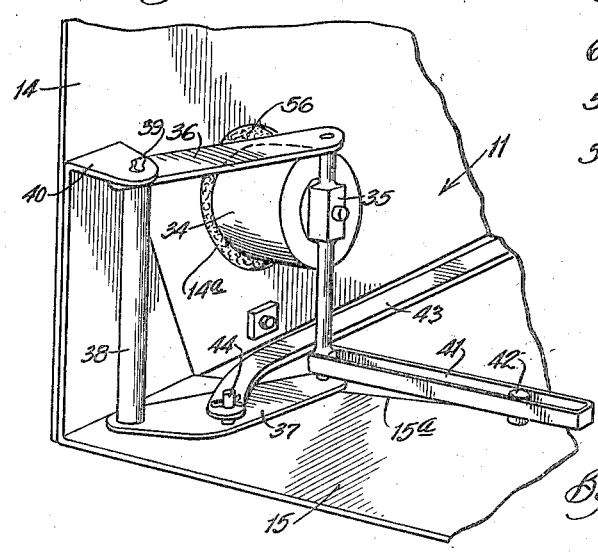

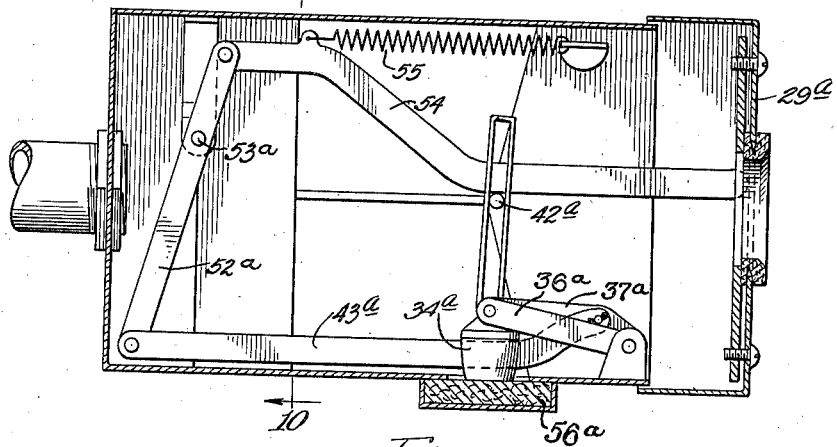
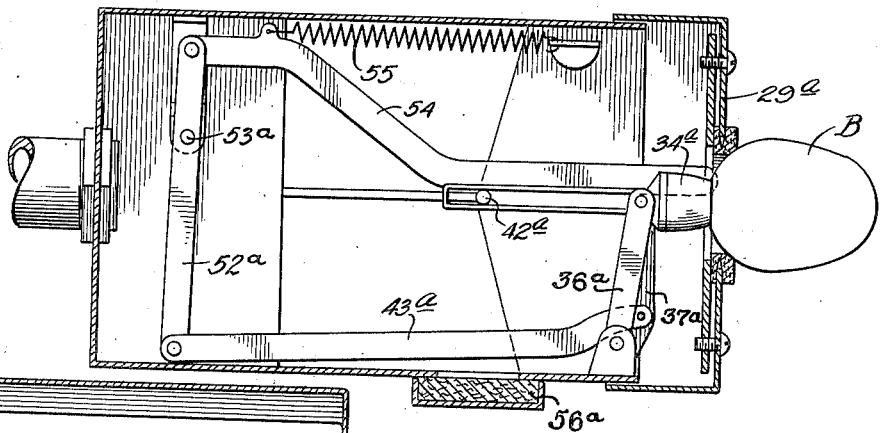
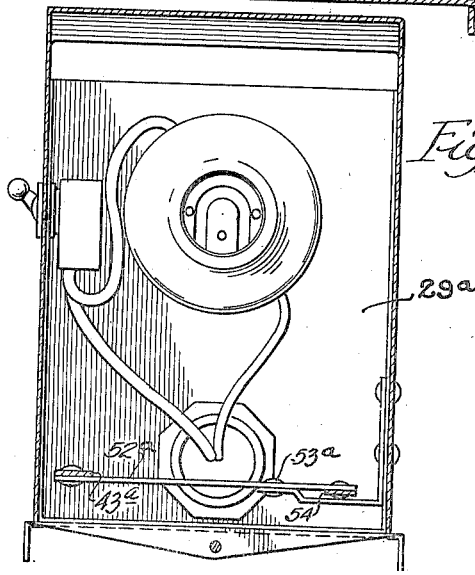

Patented Aug. 1, 1939

2,167,853

UNITED STATES PATENT OFFICE 2,167,853

EGG CANDLER AND STAMPER

John Roberts, Clinton, Iowa, assignor to The Collis Company, Clinton, Iowa, a corporation of Iowa Application October 7, 1936, Serial No. 104,424

6 Claims. (Cl. 88—14.2)

An object of this invention is to provide an improved form of egg candler and stamper wherein each egg to be candled is pressed against a peep hole in a light compartment to close the same and on further movement of the egg to operate mechanism to stamp the egg.

Another object of this invention is to provide an improved form of egg candler and stamper having a stationary ink pad and a stamp movable by pressure from contact with the ink pad to contact with the egg.

These and other objects, as will hereinafter appear, are accomplished by this invention which is fully described in the following specification and shown in the accompanying drawings, in which:

Figure 1 is a perspective view of one embodiment of the invention;

Fig. 2 is a somewhat enlarged vertical section on the line 2—2 of Fig. 1.

Fig. 3 is a wiring diagram of the electrical apparatus embodied in the form shown in Fig. 1;

Fig. 4 is a horizontal section on the line 4 of Fig. 2 showing the apparatus in the normal inoperative position;

Fig. 5 is a similar section showing the stamp in the position of stamping an egg;

Fig. 6 is a section on the line 6 of Fig. 1;

Fig. 7 is a partial enlarged perspective showing the interior of the lower left side of the light compartment with the cover removed;

Fig. 8 is a view similar to Fig. 4 showing a modified form of the apparatus which is manually operated and which is in the normal inoperative position;

Fig. 9 is a view similar to Fig. 8 but showing the apparatus stamping an egg; and Fig. 10 is a vertical section on the line 10—10 of Fig. 8.

The apparatus, as shown in Figs. 1 to 7 inclusive, comprises a light compartment 11, having a top 12, sides 13 and 14, a bottom 15, and a rear end 16, which is suitably supported on a tubular member 17 which may be adjustably secured by means of a set screw 18 to a foot 19. The latter may be secured by means of screws 20 to a vertical wall 21.

An incandescent lamp 22 is mounted in a suitable base or socket 23, and this is adapted to be supplied with current from a suitable source of power through leads 24, 25, in which is placed a switch 26. This connection which is quite simple is shown diagrammatically in Fig. 3. By inserting the plug 27 (Fig. 1) at the end of the cord 28 in a suitable socket, leads 24, 25 become connected to the power line, and upon closing the switch 26, the lamp 22 will be lighted.

The front of the light compartment is closed by a cover 29 which is hingedly mounted at 30 and normally held in the position shown in Fig. 2, as will later be described. This hinged cover has an opening in which is loosely fitted an annular rim 31, of leather, rubber, or the like, having an annular slot 31ª and which is adjustably held in place by means of a clip 32 and screws 33. This rim being of relatively soft material is adapted to receive an egg to be candled without danger of injury thereto. The operator presents an egg to the opening in the rim 31 and is able to determine the condition of the egg from the appearance which it presents when the light passes through it.

It is usually desirable to illuminate the space beneath the candling device, and for this purpose an opening 15ª is made in the bottom 15, and this may be covered or uncovered by means of a slidable shutter 15ᵇ, which is mounted on a wire 15ᶜ. By means of this shutter, the opening 15ª may be adjusted from substantially closed to wide open, depending on the amount of illumination desired on objects beneath the device. Air passing up through this opening becomes heated by the lamp 22 and passes out through the opening 12ª which also serves to pass some light to objects in the rear.

The electrically operated egg stamp mechanism will now be described. This consists of a hollow rubber stamp 34 which is mounted on a rod 35 which is pivotally mounted at its ends in parallel levers 36, 37 which are rigidly secured to a tube 38 which is journaled on a pin 39 which is secured at one end in the ear 40 and at the other to the bottom 15.

The rod 35 has rigidly secured thereto a U-shaped strap 41 which acts as a guide, the strap passing over a pivot pin 42 secured to the bottom of the compartment. The levers 36, 37 swing about the pin 39 by means of a link 43 which is pivotally secured to the lever 37 by means of a pin 44. The opposite end of the link 43 is pivotally secured to the lever 45 which is fulcrumed at 46, the opposite end of the lever being connected through a link 47 with the core 48 of a solenoid 49. A spring 50 normally holds the parts in the position shown in Fig. 4. With the parts in the position of Fig. 5 the rim 31 may be adjusted so that the stamp is in the center of the peep hole.

Upon candling of an egg, pressure thereof on the rim 31 will produce an inward swinging of the cover which through connected links 52 and 53 will cause a switch 51 to be closed, thereby energizing the solenoid 49 and drawing the core 48 within the solenoid. This rocks the lever 45 in a counterclockwise direction to the position shown in Fig. 5. In this position the link 43 has rocked the levers 36, 37 in a clockwise direction which causes the stamp 34 and strap 41 to move about the pin 42 in a counterclockwise direction so that the stamp will now be presented in the center of the rim 31 so as to stamp an egg A held therein. The egg is then immediately withdrawn, the solenoid is deenergized, and the spring 50 returns the various parts to the position shown in Fig. 4.

In Figs. 8, 9 and 10 is shown a modified form of the egg stamping device which is operated manually instead of electrically. In this the stamp and that portion of the operating mechanism shown in Fig. 7 are the same as those previously described, and so are given corresponding reference numbers with "a" added thereto. The link 43ª, however, is connected to a lever 52ª which is fulcrumed at 53ª, the opposite end of the lever being hingedly connected to a plunger 54 which is guided by the pin 42ª and is normally retracted by means of a spring 55 which also serves to hold the plunger 54 against the pin 42ª. The end of this plunger engages the inside of the cover 29ª.

Thus, when the operator desires to stamp the egg, he presses against the cover 29ª, forcing the plunger 54 back, and causing the stamp 34ª to move from the position of Fig. 8 to the position of Fig. 9, in which latter position the stamp is impressed upon the egg. While the cover 29ª moves only a small amount, the stamp 34ª moves a relatively greater amount due to the arrangement of the interconnected system of levers.

In both forms the stamp normally rests as shown in Fig. 6 against a suitable ink pad 56 which lies behind an opening 14ª in the side wall 14 at one side of the peep hole and is contained in a suitable cup 57 from which it can readily be removed for replacement. An ink tube 58 lies at the top of the pad and may be rotated by means of a lever 59 from the full line to the dotted line position of Fig. 1. The tube has an opening 60 near its center through which ink may slowly seep into the pad in the position shown. When not in use the lever 59 is raised to the dotted line position to stop the flow of ink.

The mechanism shown in Fig. 7 allows the stamp to lie at one side of the device so as not to interfere with candling the egg. While so positioned the stamp remains in contact with the stationary ink pad. By the system of links which I have described the stamp is moved by a compound motion which is a combination of translation and swinging movements from a position in which the stamp is in contact with the ink pad at one side of the device into a position in which it is in contact with an egg being candled. In the latter position the stamp preferably faces substantially 90° from its position in contact with the ink pad. At the same time the stamp does not obstruct light for the opening 15ª when in either position.

Thus, it will be seen that I have provided in each of these forms a simple and efficient means for candling and stamping eggs.

I claim:

1. An egg candling and stamping apparatus comprising a housing containing a light source, a relatively movable member connected to said housing at one side thereof and having an egg receiving and candling opening facing the light source, a stamping apparatus including a stamp, a combined sliding and pivotal means mounting said stamp on a wall of said housing so that the stamp may swing through an arc of about 90° from a normally inoperative position within said housing to a position facing the opening in said member, and a lever system connected to said member and including a link pivoted to a wall of said housing adjacent said member and to said stamp and operable on movement of said member to swing said stamp to said position facing the opening in said member and then advance the stamp slidably on said mounting means toward said candling opening to stamp an egg therein.

2. An egg candling and stamping apparatus comprising a housing containing a source of light, said housing having a relatively movable closure provided with an egg receiving opening, a stamping means including a stamp, a pivotal and sliding means mounting the stamp on a wall of the housing at one side of the light source, a lever system connected to said stamp, and spring means associated with said lever system and normally holding said stamp with its impression face away from said opening, said lever system including a link pivoted to a wall of the housing adjacent said closure and to said stamp and having a part in cooperative relation with said closure, whereby upon movement of said closure said stamp may be first swung on said mounting means by said lever system through an arc of about 90° to position its impression face in alignment with said opening and thereafter to slide on said mounting means toward said opening.

3. In an egg candler comprising a housing having a source of light therein and a relatively movable egg receiving means including a peep hole at one side of said housing, a stamping apparatus including a stamp, a pivotal and sliding mounting for said stamp within said housing offset with respect to the light source and peep hole, a lever means including a link pivoted to a wall of said housing adjacent said egg receiving means and to said stamp and normally holding the same with its impression face away from said peep hole, said lever means having a part operatively associated with said egg receiving means for causing said lever means to first swing the stamp and then slide said stamp on said mounting towards the peep hole to stamp an egg therein.

4. In an egg candler including a housing having a light source therein, an egg receiving member including a peep hole movably mounted on said housing, and means for marking an egg in said peep hole, comprising an ink pad and a pivot pin fixedly mounted on angularly disposed walls of said housing adjacent one side of said egg receiving member, a rubber stamp swingably and slidably mounted on said pin, lever means to normally hold said stamp with its impression face in engagement with said pad, said last mentioned means including a link pivoted to a wall of said housing adjacent said egg receiving member and having a part operatively associated with said member, said lever means being operable by movement of said egg receiving member for swinging said stamp away from said pad and into alignment with said peep hole for final sliding movement on said pin to contact an egg in said peep hole.

5. In an egg candler including a housing having a light source therein, an egg receiving member including a peep hole movably mounted on said housing, and means for marking an egg in said peep hole, comprising an ink pad and a pivot pin fixedly mounted on angularly disposed walls of said housing adjacent one side of said egg receiving member, a rubber stamp swingably and slidably mounted on said pin, lever means to normally hold said stamp with its impression face in engagement with said pad, said last mentioned means comprising a solenoid operated lever means including a link pivoted to a wall of said housing adjacent said egg receiving member and operatively associated therewith for swinging said stamp on said pin away from said pad and into alignment with said peep hole for final sliding movement on said pin to contact an egg in said peep hole, and means operated by movement of said egg receiving member for energizing said solenoid.

6. A combined egg candler and stamping apparatus comprising a light compartment having fixed sides and one fixed end wall, a cover movably mounted on the opposite end of said compartment and having a peep hole therein adapted to receive an egg, an ink pad and a pin fixedly mounted on two adjacent side walls of said compartment, a rubber stamp swingably and slidably engaging the pin within said compartment, means normally holding the impression face of said stamp in engagement with said pad, said last mentioned means including a lever system having a link pivoted to a wall of said compartment adjacent said cover and to said stamp, and means connecting said lever system with said movable cover, whereby upon movement of said cover said stamp carrying member is first swung by said lever system on said pin away from said pad and toward said peep hole and thereafter slid on said pin into contact with an egg in the peep hole.

JOHN ROBERTS.